United States Patent
Takenaka

(10) Patent No.: US 10,850,564 B2
(45) Date of Patent: Dec. 1, 2020

(54) WINTER TIRE

(71) Applicant: SUMITOMO RUBBER INDUSTRIES, LTD., Kobe (JP)

(72) Inventor: Mikako Takenaka, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 9 days.

(21) Appl. No.: 16/093,515

(22) PCT Filed: Dec. 5, 2016

(86) PCT No.: PCT/JP2016/086072
§ 371 (c)(1),
(2) Date: Oct. 12, 2018

(87) PCT Pub. No.: WO2017/195392
PCT Pub. Date: Nov. 16, 2017

(65) Prior Publication Data
US 2019/0176520 A1 Jun. 13, 2019

(30) Foreign Application Priority Data
May 11, 2016 (JP) .................. 2016-095588

(51) Int. Cl.
B60C 1/00 (2006.01)
C08K 3/36 (2006.01)
C08L 7/00 (2006.01)
C08L 45/00 (2006.01)
C08L 9/00 (2006.01)

(52) U.S. Cl.
CPC .............. B60C 1/0016 (2013.01); B60C 1/00 (2013.01); C08K 3/36 (2013.01); C08L 7/00 (2013.01); C08L 9/00 (2013.01); C08L 45/00 (2013.01)

(58) Field of Classification Search
CPC . B60C 1/0016; B60C 1/00; C08L 9/00; C08L 45/00; C08L 7/00; C08K 3/36
USPC ....................................................... 523/157
See application file for complete search history.

(56) References Cited

U.S. PATENT DOCUMENTS

| 2010/0036025 A1 | 2/2010 | Rodgers et al. |
| 2010/0179247 A1 | 7/2010 | Vest et al. |
| 2013/0030111 A1 | 1/2013 | Kojima |
| 2015/0247027 A1 | 9/2015 | Kojima |
| 2016/0075863 A1* | 3/2016 | Sakaki ............... C08L 9/00 523/156 |
| 2016/0376426 A1 | 12/2016 | Kimura |
| 2017/0190886 A1 | 7/2017 | Sakurai |
| 2017/0218185 A1* | 8/2017 | Takahashi ............ B60C 1/00 |

FOREIGN PATENT DOCUMENTS

| CN | 101636284 A | 1/2010 | |
| EP | 2014711 A2 | 1/2009 | |
| JP | 2008-221955 A | 9/2008 | |
| JP | 2009-138025 A | 6/2009 | |
| JP | 2011-88988 A | 5/2011 | |
| JP | 2014-80050 A | 5/2014 | |
| JP | 2014-205842 A | 10/2014 | |
| JP | 2015-523430 A | 8/2015 | |
| JP | 2015-221884 A | 12/2015 | |
| JP | 2016-27176 A | 2/2016 | |
| RU | 2 519 393 C2 | 6/2014 | |
| WO | WO 2013/176712 A1 | 11/2013 | |
| WO | WO 2015/079703 A1 | 6/2015 | |
| WO | WO-2015173993 A1 * | 11/2015 | ............... C08L 9/00 |
| WO | WO 2015/182778 A | 12/2015 | |

OTHER PUBLICATIONS

International Preliminary Report on Patentability and English translation of the Written Opinion of the International Searching Authority (Forms PCT/IB/338, PCT/IB/373 and PCT/ISA/237) for International Application No. PCT/JP2016/086072, dated Nov. 22, 2018.
Database WPI Week Jan. 2016, Thompson Scientific, London, GB; AN 2015-77769L, XP-002793290, 2016, 2 pages.
Extended European Search Report, dated Aug. 9, 2019, for corresponding European Application No. 16901737.3.
Russian Office Action and Search Report for Russian Application No. 2018137890/05, dated May 27, 2019, with an English translation.
International Search Report (PCT/ISA/210) issued in PCT/JP2016/086072, dated Feb. 7, 2017.
Written Opinion of the International Searching Authority (PCT/ISA/237) issued in PCT/JP2016/086072, dated Feb. 7, 2017.
Chinese Office Action and Search Report for Chinese Application No. 201680085023.4, dated Jul. 1, 2020, with an English translation.

* cited by examiner

Primary Examiner — Angela C Scott
(74) Attorney, Agent, or Firm — Birch, Stewart, Kolasch & Birch, LLP

(57) ABSTRACT

An object is to provide a winter tire being excellent in performance on ice and performance for inhibiting clogging with snow and accretion of snow. The present invention relates to a winter tire having a tread composed of a rubber composition comprising 2.5 to 30 parts by mass of a cyclopentadiene-based resin and 5 to 100 parts by mass of silica based on 100 parts by mass of a rubber component comprising a natural rubber.

8 Claims, No Drawings

WINTER TIRE

TECHNICAL FIELD

The present invention relates to a winter tire composed of a given rubber composition.

BACKGROUND OF THE INVENTION

For running on ice and snow on a road, use of spike tires and fitting of chains on tires have been employed so far. However, in the case of using spike tires and chains, a road surface is scraped by metal pins of the spike tires and the chains mounted on the tires, which causes a problem with dusts floating in the air which result from a scraped road material. Therefore, in place of use of spike tires and chains, winter tires such as studless tires are proposed as tires for running on an ice- and snow-covered road.

In the case of normal tires, a friction coefficient decreases remarkably on an ice-covered road surface as compared with a general road surface, and tires easily slip. Meanwhile, ideas are provided on winter tires from material and design points of view. For example, a development of a rubber composition prepared by compounding a diene rubber being excellent in low temperature property and a means of increasing edge portions on a tire surface by changing ruggedness on a tire surface are reported. However, still it cannot be said that steering stability of a studless tire on ice (performance on ice) is sufficient.

Further, for improving grip performance on ice and snow of winter tires, there have been proposed a method of increasing adhesive friction force by decreasing a hardness (Hs) of a rubber composition for a tread, thereby decreasing an elastic modulus at low temperature (improving low temperature property), a method of obtaining a gripping force on an ice- and snow-covered road by providing given sipes on a block surface of a tread, and a method of obtaining a gripping force by providing, on a tread surface, deep transverse grooves for compressing snow and gripping the compressed snow during running.

The sipes provided on a block surface of a tread come into contact with ice and snow on a road, thereby making it possible to exhibit a gripping force. However, when "accretion of snow", which is a phenomenon of snow adhering to a surface of a tread, occurs, there is a problem that the sipes cannot come into contact with snow and ice on a road, thereby making it impossible to exhibit grip performance on ice and snow which the tire has originally.

Snow gripped by the transverse grooves is removed until a tire makes one rotation and the transverse grooves come into contact with snow on the road again. Thus, the transverse grooves can exhibit the gripping force repeatedly. However, when "clogging with snow" occurs and snow cannot be removed from the tread, there is a problem that the transverse grooves cannot grip snow, namely on-snow grip performance which the tire has originally cannot be exhibited.

In order to solve the above-mentioned problems, a method of forming a tread pattern such as transverse grooves into a given shape has been proposed. For example, Patent Document 1 discloses a method of inhibiting accretion of snow by forming a tread pattern into a given shape. Further Patent Document 2 discloses a method of inhibiting the clogging with snow by designing transverse grooves to have a given shape.

PRIOR ART DOCUMENTS

Patent Documents

Patent Document 1: JP 2008-221955 A
Patent Document 2: JP 2014-080050 A

SUMMARY OF THE INVENTION

Problem to be Solved by the Invention

There is a limit in inhibiting clogging with snow and accretion of snow only by considering a tread pattern shape such as transverse grooves, and further improvement of grip performance on ice is demanded. Furthermore, since a tread pattern shape such as transverse grooves is bound to one being capable of inhibiting clogging with snow and accretion of snow, there are problems that a degree of freedom in designing of the shape is lowered and that performance on ice and snow, abrasion resistance, and wet grip performance are sacrificed.

Recently a demand for reduction of fuel consumption of a vehicle has been increasing, and a demand for decreasing a rolling resistance of a tire to inhibit heat generation of the tire has been increasing more and more, and a demand for enhancement of fuel efficiency is required in particular for a tread because it has a high share in the tire components.

An object of the present invention is to provide a winter tire being excellent in performance on ice, performance for inhibiting clogging with snow, performance for inhibiting accretion of snow, and performance on fuel efficiency.

Means to Solve the Problem

The present invention relates to a winter tire having a tread composed of a rubber composition comprising 2.5 to 30 parts by mass of a cyclopentadiene-based resin and 5 to 100 parts by mass of silica based on 100 parts by mass of a rubber component comprising a natural rubber.

It is preferable that the cyclopentadiene-based resin is a hydrogenated dicyclopentadiene resin.

Effects of the Invention

According to the winter tire having a tread composed of the rubber composition comprising given amounts of the cyclopentadiene-based resin and silica based on the rubber component comprising a natural rubber. It is possible to provide a winter tire being excellent in performance on ice, performance for inhibiting clogging with snow, performance for inhibiting accretion of snow, and performance on fuel efficiency without impairing wet performance and abrasion resistance indexes.

EMBODIMENT FOR CARRYING OUT THE INVENTION

The winter tire of the present invention is featured by having a tread composed of the rubber composition comprising given amounts of the cyclopentadiene-based resin and silica based on the rubber component comprising a natural rubber.

The rubber component comprises a natural rubber. Examples of the natural rubber include natural rubbers (NR) generally used in the field of tire industry such as SIR20, RSS#3 and TSR20, and modified natural rubbers such as epoxidized natural rubber (ENR), hydrogenated natural rubber (HNR), deproteinized natural rubber (DPNR) and high purity natural rubber (UPNR). Among these, NRs are preferable for the reason of securing abrasion resistance.

A content of natural rubber in the rubber component is preferably 10% by mass or more, more preferably 20% by mass or more, from the viewpoint of excellent kneading processability and extrusion processability of the rubber. Further, the content of natural rubber is preferably 80% by mass or less, more preferably 70% by mass or less, from the viewpoint of excellent low temperature property.

The rubber component may comprise a diene rubber component other than a natural rubber. The diene rubber component other than a natural rubber may include, for example, isoprene rubber (IR), butadiene rubber (BR), styrene-butadiene rubber (SBR), acrylonitrile-butadiene rubber (NBR), chloroprene rubber (CR), styrene-isoprene-butadiene rubber (SIBR) and ethylene-propylene-diene rubber (EPDM). Among these, it is preferable to include BR in addition to the above-mentioned natural rubber from the viewpoint of excellent low temperature property.

Various BRs can be used as BR such as, a high cis-1,4-poly butadiene rubber (high-cis BR), a butadiene rubber comprising 1,2-syndiotactic polybutadiene crystals (SPB-containing BR), and a modified butadiene rubber (modified BR).

The high-cis BR is a butadiene rubber in which the content of cis-1,4 bond is not less than 90% by weight. Examples of such high-cis BR include BR1220 manufactured by ZEON CORPORATION, BR130B and BR150B manufactured by Ube Industries, Ltd. and the like. Low-temperature property and abrasion resistance can be improved by compounding the high-cis BR.

An example of an SPB-containing BR is not one in which 1,2-syndiotactic polybutadiene crystals are simply dispersed in the BR, but one in which 1,2-syndiotactic polybutadiene crystals are chemically bonded with the BR and dispersed therein. Examples of such SPB-containing BR include VCR-303, VCR-412 and VCR-617 manufactured by Ube Industries, Ltd. and the like.

Examples of a modified BR include a modified BR (tin-modified BR) obtained by performing polymerization of 1,3-butadiene with a lithium initiator and then adding a tin compound, and further having the molecular terminals bonded with a tin-carbon bond, a butadiene rubber (modified BR for silica) having an alkoxysilane condensate compound in an active terminal thereof and the like. Examples of such modified BRs include BR1250H (tin-modified) manufactured by ZEON CORPORATION, S-modified polymer (modified for silica) manufactured by Sumitomo Chemical Industry Company Limited and the like.

Among these various BRs, use of high-cis BR and modified BR for silica is preferable from the viewpoint of excellent low temperature property and abrasion resistance.

In the case where the rubber component comprises BR, its content is preferably 20% by mass or more, more preferably 30% by mass or more, from the viewpoint of low-temperature property and abrasion resistance. Further, the content of the various BRs is preferably 90% by mass or less, more preferably 80% by mass or less, from the viewpoint of prevention of deterioration of rubber processability.

The rubber component may comprise, besides the diene rubber component, rubber components such as butyl rubber (IIR), halogenated butyl rubber (X-IIR) and a halogenated product of a copolymer of an isomonoolefin and p-alkylstyrene. However, it is preferable that these rubber components are not contained from the viewpoint that a low temperature property decreases greatly.

The rubber composition according to the present invention is featured by comprising the cyclopentadiene-based resin. The tire having a tread composed of the rubber composition comprising the cyclopentadiene-based resin has enhanced performance on ice, performance for inhibiting clogging with snow, performance for inhibiting accretion of snow, and performance on fuel efficiency.

The cyclopentadiene-based resin is featured by having an SP value lower than those of other adhesive resins used for a rubber composition for a tire such as coumarone resin, petroleum resins (such as aliphatic petroleum resin, aromatic petroleum resin and alicyclic petroleum resin), phenolic resin and rosin derivative. The SP value stands for a solubility parameter calculated by the Hoy method based on a structure of a compound, and as SP values of two compounds are far different from each other, it indicates that compatibility is low. The smaller SP value of the cyclopentadiene-based resin than other adhesive resin's one (about 9 to 12) means the SP value being close to the SP value of a natural rubber (about 8.15), which shows that the cyclopentadiene-based resin has good compatibility with a natural rubber. As a result, when compounding, as a resin component, the cyclopentadiene-based resin to a rubber component comprising a natural rubber, a loss tangent around 0° C. (0° C. tan δ) increases remarkably while tan δ other than the 0° C. tan δ does not increase so much. Therefore, by using the rubber composition comprising the cyclopentadiene-based resin as a member for a tread of a tire, performance on ice can be improved without lowering other performances such as wet performance and abrasion resistance. Further, the SP value of water is about 23, and the cyclopentadiene-based resin having the SP value lower than those of other adhesive resins is an adhesive resin having less compatibility with water. Thus, the rubber composition comprising the cyclopentadiene-based resin has improved water repellency, and performance for inhibiting clogging with snow and accretion of snow can be enhanced. It is noted that, the above-mentioned Hoy method is a calculation method described in, for example, K. L. Hoy "Table of Solubility Parameters", Solvent and Coatings Materials Research and Development Department, Union Carbite Corp. (1985).

Examples of the cyclopentadiene-based resin include a dicyclopentadiene resin, a cyclopentadiene resin, a methylcyclopentadiene resin (cyclopentadiene-based resins not subjected to hydrogenation), and these cyclopentadiene-based resins subjected to hydrogenation treatment (hydrogenated cyclopentadiene-based resins).

Among the cyclopentadiene-based resins, a hydrogenated dicyclopentadiene resin is preferable. The hydrogenation treatment of the cyclopentadiene-based resin can be conducted by a known method, and in the present invention, hydrogenated cyclopentadiene-based resins available on the market can also be used.

A softening point of the cyclopentadiene-based resin is preferably not lower than 80° C., more preferably not lower than 90° C., further preferably not lower than 100° C. from the viewpoint of easy handling. Further the softening point of the cyclopentadiene-based resin is preferably not higher than 160° C., more preferably not higher than 150° C., further preferably not higher than 140° C. from the viewpoint of improvements of processability and of dispersibility of filler with rubber component. In addition, in the present invention, the softening point of the resin is determined by a method such that while heating 1 g of the resin as a sample at a temperature elevating rate of 6° C. per minute using flow tester (CFT-500D manufactured by Shimadzu Corporation or the like), a load of 1.96 MPa is applied to the sample with a plunger, the sample is extruded through a nozzle having a diameter of 1 mm and a length of 1 mm, and a descending distance of the plunger of the flow tester to a temperature is plotted. The softening point of the resin is a temperature when a half of the sample was flowed out.

A glass transition temperature (Tg) of the cyclopentadiene-based resin is preferably not higher than 90° C., more preferably not higher than 80° C. from the viewpoint of preventing the glass transition temperature from becoming higher, thereby deteriorating durability. Further, a lower limit of the glass transition temperature of the cyclopentadiene-based resin is not limited particularly, and is preferably 30° C. or higher for the reason that a weight-average molecular weight (Mw) can be made equal to or higher than that of oil and a less volatile property can be secured. The weight-average molecular weight of the cyclopentadiene-based resin is preferably 1,000 or lower since volatility at high temperature is excellent and the resin disappears easily.

The SP value of the cyclopentadiene-based resin is preferably not more than 8.5, more preferably not more than 8.4 for the reason that water repellency of the rubber composition can be improved more. A lower limit of the SP value of the cyclopentadiene-based resin is preferably not less than 7.9 from the viewpoint of compatibility with the rubber component.

A content of the cyclopentadiene-based resin based on 100 parts by mass of the rubber component is preferably not less than 2.5 parts by mass, more preferably not less than 5 parts by mass, further preferably not less than 10 parts by mass, for the reason that a good effect of the present invention can be obtained. Further, the content of the cyclopentadiene-based resin is preferably not more than 30 parts by mass, more preferably not more than 20 parts by mass, from a point that a hardness, mold-processability and a viscosity of the rubber composition can be secured.

The rubber composition according to the present invention comprises silica. Silica is not limited particularly, and there are, for example, silica prepared by a dry method (anhydrous silica) and silica prepared by a wet method (hydrous silica), and hydrous silica is preferred for the reason that many silanol groups are contained.

A nitrogen adsorption specific surface area ($N_2SA$) of the silica is preferably not less than 80 $m^2/g$, more preferably not less than 100 $m^2/g$, from the viewpoint of durability and an elongation at break. On the other hand, the $N_2SA$ of the silica is preferably not more than 250 $m^2/g$, more preferably not more than 220 $m^2/g$, from the viewpoint of fuel efficiency and processability. It is noted that the $N_2SA$ of the silica as used herein is a value measured in accordance with ASTM D3037-93.

When the rubber composition comprises the silica, the content of the silica is preferably not less than 5 parts by mass, more preferably not less than 10 parts by mass based on 100 parts by mass of the rubber component, from the viewpoint of durability and an elongation at break. On the other hand, the content of the silica is preferably not more than 100 parts by mass, more preferably not more than 90 parts by mass, from the viewpoint of enhancing dispersibility during kneading and for inhibiting lowering of processability due to re-agglomeration of silica during heating at rolling and during storage after rolling.

When the rubber composition comprises the silica, it is preferable that the silica is used in combination with a silane coupling agent. Any silane coupling agent which has been used in combination with silica in the rubber industry can be used as the silane coupling agent, and examples thereof include sulfide silane coupling agents such as Si75, Si266 (bis(3-triethoxysilylpropyl)disulfide) manufactured by Evonik Degussa and Si69 (bis(3-triethoxysilylpropyl)tetrasulfide) manufactured by Evonik Degussa; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination with two or more thereof. Among them, sulfide silane coupling agents and mercapto silane coupling agents are preferable from the viewpoint of their strong binding force with silica and excellent low heat build-up characteristic.

When the rubber composition comprises the silane coupling agent, the content of the silane coupling agent is preferably not less than 2 parts by mass, more preferably not less than 3 parts by mass based on 100 parts by mass of the silica. When the content of the silane coupling agent is less than 2 parts by mass, there is a tendency that an effect of improving dispersion of the silica is not obtained sufficiently. On the other hand, the content of the silane coupling agent is preferably not more than 25 parts by mass, more preferably not more than 20 parts by mass. When the content of the silane coupling agent exceeds 25 parts by mass, an effect for a cost tends not to be obtained.

In addition to the rubber component and the cyclopentadiene-based resin, the rubber composition in the present invention can comprise compounding agents and additives having been used in the rubber industry, for example, various reinforcing fillers other than silica, a coupling agent, zinc oxide, oils, a softening agent, wax, antioxidants, stearic acid, a vulcanizing agent such as sulfur, a vulcanization accelerator and the like, properly as required.

Examples of the various reinforcing fillers other than silica include those which can be optionally selected from those having been used for rubber compositions for a tire, and carbon black is preferable.

Examples of the carbon black include furnace black, acetylene black, thermal black, channel black, graphite and the like and these carbon blacks may be used alone or may be used in combination with two or more thereof. Among them, furnace black is preferable for the reason that low temperature characteristics and abrasion resistance can be enhanced in good balance.

A nitrogen adsorption specific surface area ($N_2SA$) of the carbon black is preferably not less than 70 $m^2/g$, more preferably not less than 90 $m^2/g$, from the viewpoint that sufficient reinforcing property and abrasion resistance can be obtained. Further, the $N_2SA$ of the carbon black is preferably not more than 300 $m^2/g$, more preferably not more than 250 $m^2/g$, from the viewpoint of excellent dispersibility and a property of being hard to generate heat. It is noted that the $N_2SA$ of the carbon black as used herein is measured in accordance with JIS K6217-2 "Carbon black for rubber industry—Fundamental characteristics—Part 2: Determination of specific surface area—Nitrogen adsorption method—Single-point procedures", When the rubber composition comprises the carbon black, the content thereof is preferably not less than 3 parts by mass, more preferably not less than 4 parts by mass, based on 100 parts by mass of the rubber component. When the content is less than 3 parts by mass, there is a tendency that a sufficient reinforcing property cannot be obtained. On the other hand, the content of the carbon black is preferably not more than 200 parts by mass, more preferably not more than 150 parts by mass, further preferably not more than 60 parts by mass. When the content is more than 200 parts by mass, there is a tendency that processability is lowered, heat generation is prone to arise and abrasion resistance is lowered.

The rubber composition of the present invention can be prepared by a known method. For example, the rubber composition can be prepared by kneading each of the above-mentioned components using a rubber kneading apparatus such as an open roll, a Banbury mixer, a closed kneader or the like and then conducting vulcanization, or by other method.

A rubber hardness (Hs) at 25° C. of the rubber composition of the present invention is preferably not more than 60, more preferably not more than 55, from the viewpoint of performance on ice. On the other hand, the Hs is preferably not less than 40, more preferably not less than 45, from the viewpoint of maintaining block rigidity of a tire. It is noted that herein, the rubber hardness (Hs) is a hardness which is a value measured in accordance with JIS K6253-3.

A glass transition temperature (Tg) of the rubber composition of the present invention is preferably −35° C. or lower, more preferably −40° C. or lower from the viewpoint of excellent low temperature characteristic.

The winter tire of the present invention can be produced by a usual method using the above-mentioned rubber composition. Namely, the unvulcanized rubber composition prepared by kneading the above-mentioned components is extrusion-processed into a shape of a tire tread, and further, the obtained extruded product is laminated with other tire parts to form an unvulcanized tire on a tire molding machine by a usual forming method. The winter tire of the present invention can be produced by heating and pressurizing this unvulcanized tire in a vulcanizer. The rubber composition is one being capable of inhibiting clogging with snow and accretion of snow, and therefore, it is preferable to use the rubber composition for constituting a tread and/or a side wall at an outer periphery of a tire, and is more preferable to use the rubber composition for constituting a tread further required to inhibit clogging with snow and accretion of snow.

EXAMPLE

The present invention is then explained by means of Examples, but is not limited to the Examples.

A variety of chemicals used in Examples and Comparative Examples will be explained below.
NR: TSR20
BR: BR 1220 (unmodified BR, cis content: 96% by mass) manufactured by ZEON CORPORATION
Carbon black: DIABLACK I (ASTM No. N220, $N_2SA$: 114 $m^2/g$, DBP: 114 ml/100 g) manufactured by Mitsubishi Chemical Corporation
Silica: ULTRASIL VN3 ($N_2SA$: 175 $m^2/g$, average primary particle size: 15 nm) manufactured by Evonik Degussa GmbH
Silane coupling agent: Si75 (bis(3-triethoxysilylpropyl)disulfide) manufactured by Evonik Degussa GmbH
Oil: Process X-140 (aromatic oil) manufactured by JX Nippon Oil & Energy Corporation
Aromatic petroleum resin: Sylvatraxx 4401 (main component: α-methylstyrene, softening point: 85° C.) manufactured by Arizona Chemical Company, LLC
Cyclopentadiene-based resin 1: Oppera PR-140 (hydrogenated dicyclopentadiene resin, softening point: 100° C.) manufactured by Exxon Mobil Corporation
Cyclopentadiene-based resin 2: Oppera PR-120 (hydrogenated dicyclopentadiene resin, softening point: 120° C.) manufactured by Exxon Mobil Corporation
Stearic acid: Stearic acid "Tsubaki" manufactured by NOF Corporation
Antioxidant: ANTIGENE 6C (N-(1,3-dimethylbutyl)-N'-phenyl-p-phenylenediamine) manufactured by Sumitomo Chemical Company Limited.
Wax: SUNNOC N manufactured by OUCHI SHINKO CHEMICAL INDUSTRIAL CO., LTD.
Zinc oxide: Zinc Oxide No. 1 manufactured by Mitsui Mining & Smelting Co., Ltd.
Vulcanization accelerator DPG: Nocceler D (1,3-diphenylguanidine) manufactured by OUCHI SHINKO CHEMICAL INDUSTRIAL CO., LTD.
Vulcanization accelerator CZ: Nocceler CZ (N-cyclo-hexyl-2-benzothiazolylsulfeneamide) manufactured by OUCHI SHINKO CHEMICAL INDUSTRIAL CO., LTD.
Sulfur: Powdered sulfur manufactured by Kairuizawa Iou Kabushiki Kaisha

EXAMPLES AND COMPARATIVE EXAMPLES

Chemicals except sulfur and vulcanization accelerators were kneaded in a 1.7-liter closed Banbury mixer according to the compounding formulations shown in Tables 1 and 2 for five minutes until a temperature reached 150° C., and a kneaded product was obtained. Subsequently after adding sulfur and vulcanization accelerators to the obtained kneaded product, the mixture was subjected to kneading at 80° C. for three minutes using an open roll to obtain an unvulcanized rubber composition. Further, the obtained unvulcanized rubber composition was subjected to press-vulcanization at 170° C. for 12 minutes to produce a test rubber composition.

The obtained unvulcanized rubber composition was extrusion-molded into a form of a tire tread using an extruder with an extrusion nozzle having a specific shape, and an extrudate was laminated with other tire members to form an unvulcanized tire, followed by press-vulcanization at 170° C. for 12 minutes to produce a test tire (tire size: 195/65R15, studless tire).

The following evaluations were made using the obtained unvulcanized rubber compositions, test rubber compositions and test tires. The results of the evaluations are shown in Tables 1 and 2.

Measurement of Rubber Hardness (Hs)

A shore hardness (Hs) at 23° C. of each of the test rubber compositions was measured using a durometer type A in accordance with JIS K6253.

Glass Transition Temperature (Tg)

A temperature distribution curve of tan δ of each of test rubber compositions was obtained using a viscoelasticity spectrometer manufactured by Iwamoto Seisakusyo Co., Ltd. under the conditions of a frequency of 10 Hz, an initial strain of 10%, an amplitude of ±0.25% and a temperature elevating rate of 2° C./min, and the temperature corresponding to the largest tan δ value in the obtained temperature distribution curve is determined as a glass transition temperature (Tg (+ C.)).

On-Ice Performance Index

A complex elastic modulus (E*) of each test rubber composition was measured by using a viscoelastic spectrometer VES (manufactured by Iwamoto Seisakusho Co., Ltd.) under the conditions of a temperature of 40° C., a frequency of 10 Hz, an initial strain of 10% and a dynamic strain of 2%. The result is indicated by an index, assuming that the complex elastic modulus in Comparative Example 1 is 100. It shows that the larger the index is, the better the on-ice performance becomes.

Fuel Efficiency Index

A loss-tangent tan δ (high temperature tan δ) of each test rubber composition was measured by using a viscoelastic spectrometer VES (manufactured by Iwamoto Seisakusho Co., Ltd.) under the conditions of a temperature of 70° C., a frequency of 10 Hz, an initial strain of 10% and a dynamic strain of 2%. The result is indicated by an index, assuming that the tan δ in Comparative Example 1 is 100. It shows that the larger the index is, the better the fuel efficiency becomes.

Wet Performance Index

A loss-tangent tan δ (low temperature tan δ) of each vulcanized rubber composition was measured by using a viscoelastic spectrometer VES (manufactured by Iwamoto Seisakusho Co., Ltd.) under the conditions of a temperature of 0° C., a frequency of 10 Hz and a dynamic strain of 0.1%. The result is indicated by an index, assuming that the tan δ in Comparative Example 1 is 100. It shows that the larger the index is, the better the wet performance becomes.

Water Repellency Index

A rubber composition for measurement of water repellency was prepared in the same manner as in the above-mentioned test rubber composition except that when press-vulcanizing an unvulcanized rubber composition, in order to unify surface roughness of a vulcanized rubber composition, a polyimide film (Kapton available from DU PONT-TORAY CO., LTD.) was put between a press-vulcanizer and an unvulcanized rubber composition. A contact angle of a liquid droplet on each of the rubber compositions for measurement of water repellency was measured with a contact angle measuring device (CA-A type device available from Kyowa Interface Science Co., Ltd.). Pure water was used as the liquid droplet, and measurement was done five seconds after the dropping. The result is indicated by an index, assuming that the contact angle in Comparative Example 1 is 100. The larger the index is, the more excellent the water repellency of the rubber composition is and the more excellent the performance for inhibiting clogging with snow and accretion of snow is.

Abrasion Resistance Index

A volume loss of each test rubber composition was measured under the conditions of a load of 50 N, a speed of 20 km/h, and a slipping angle of 5° by use of a LAT tester (Laboratory Abrasion and Skid Tester). The results are indicated with an index, assuming the result of Comparative Example 1 to be 100. The larger the index is, the more excellent the abrasion resistance is.

TABLE 1

|  | Example |  |  |  | Com. Ex. |  |
|---|---|---|---|---|---|---|
|  | 1 | 2 | 3 | 4 | 2 | 3 |
| Compounded amount (part by mass) |  |  |  |  |  |  |
| NR | 50 | 50 | 50 | 50 | 50 | 50 |
| BR | 50 | 50 | 50 | 50 | 50 | 50 |
| Carbon black | 5 | 5 | 5 | 5 | 5 | 5 |
| Silica | 70 | 70 | 70 | 70 | 70 | 70 |
| Silane coupling agent | 6 | 6 | 6 | 6 | 6 | 6 |
| Oil | 20 | 10 | 20 | 10 | 20 | 10 |
| Aromatic petroleum resin | — | — | — | — | 10 | 20 |

TABLE 1-continued

|  | Example |  |  |  | Com. Ex. |  |
|---|---|---|---|---|---|---|
|  | 1 | 2 | 3 | 4 | 2 | 3 |
| Cyclopentadiene-based resin 1 | 10 | 20 | — | — | — | — |
| Cyclopentadiene-based resin 2 | — | — | 10 | 20 | — | — |
| Stearic acid | 1.5 | 1.5 | 1.5 | 1.5 | 1.5 | 1.5 |
| Antioxidant | 2 | 2 | 2 | 2 | 2 | 2 |
| Wax | 2 | 2 | 2 | 2 | 2 | 2 |
| Zinc oxide | 2 | 2 | 2 | 2 | 2 | 2 |
| Vulcanization accelerator DPG | 3 | 3 | 3 | 3 | 3 | 3 |
| Vulcanization accelerator CZ | 2 | 2 | 2 | 2 | 2 | 2 |
| Sulfur | 1 | 1 | 1 | 1 | 1 | 1 |
| Evaluation |  |  |  |  |  |  |
| Hs | 52 | 52 | 52 | 52 | 52 | 52 |
| Tg (° C.) | −53 | −50 | −54 | −50 | −55 | −54 |
| On-ice performance index (low temperature E*) | 122 | 123 | 116 | 124 | 100 | 98 |
| Fuel efficiency index (high temperature tanδ) | 105 | 104 | 110 | 104 | 100 | 99 |
| Wet performance index (low temperature tanδ) | 102 | 103 | 99 | 104 | 100 | 102 |
| Water repellency index | 104 | 108 | 105 | 109 | 100 | 101 |
| Abrasion resistance index (LAT abrasion) | 108 | 107 | 102 | 108 | 100 | 104 |

TABLE 2

|  | Example |  |  |  | Com. Ex. |  |
|---|---|---|---|---|---|---|
|  | 5 | 6 | 7 | 8 | 3 | 4 |
| Compounded amount (part by mass) |  |  |  |  |  |  |
| NR | 30 | 30 | 30 | 30 | 30 | 30 |
| BR | 70 | 70 | 70 | 70 | 70 | 70 |
| Carbon black | 5 | 5 | 5 | 5 | 5 | 5 |
| Silica | 70 | 70 | 70 | 70 | 70 | 70 |
| Silane coupling agent | 6 | 6 | 6 | 6 | 6 | 6 |
| Oil | 20 | 10 | 20 | 10 | 20 | 10 |
| Aromatic petroleum resin | — | — | — | — | 10 | 20 |
| Cyclopentadiene-based resin 1 | 10 | 20 | — | — | — | — |
| Cyclopentadiene-based resin 2 | — | — | 10 | 20 | — | — |
| Stearic acid | 1.5 | 1.5 | 1.5 | 1.5 | 1.5 | 1.5 |
| Antioxidant | 2 | 2 | 2 | 2 | 2 | 2 |
| Wax | 2 | 2 | 2 | 2 | 2 | 2 |
| Zinc oxide | 2 | 2 | 2 | 2 | 2 | 2 |
| Vulcanization accelerator DPG | 3 | 3 | 3 | 3 | 3 | 3 |
| Vulcanization accelerator CZ | 2 | 2 | 2 | 2 | 2 | 2 |
| Sulfur | 1 | 1 | 1 | 1 | 1 | 1 |
| Evaluation |  |  |  |  |  |  |
| Hs | 55 | 55 | 55 | 55 | 55 | 55 |
| Tg (° C.) | −57 | −55 | −57 | −54 | −60 | −59 |
| On-ice performance index (low temperature E*) | 107 | 102 | 105 | 103 | 100 | 85 |
| Fuel efficiency index (high temperature tanδ) | 104 | 103 | 104 | 104 | 100 | 90 |
| Wet performance index (low temperature tanδ) | 97 | 100 | 99 | 100 | 100 | 106 |
| Water repellency index | 105 | 110 | 107 | 112 | 100 | 101 |
| Abrasion resistance index (LAT abrasion) | 102 | 109 | 104 | 115 | 100 | 108 |

From the results shown in Tables 1 and 2, it is seen that the winter tire of the present invention having a tread composed of the rubber composition comprising given amounts of the cyclopentadiene-based resin and silica is excellent in on-ice performance, performance for inhibiting clogging with snow, performance for inhibiting accretion of snow and performance on fuel efficiency without impairing wet performance and abrasion resistance indexes.

The invention claimed is:

1. A winter tire having a tread composed of a rubber composition comprising:
  2.5 to 30 parts by mass of a cyclopentadiene-based resin and 5 to 100 parts by mass of silica both based on 100 parts by mass of a rubber component comprising a natural rubber,
  wherein the cyclopentadiene-based resin has an SP value of 7.9 to 8.5.

2. The winter tire of claim 1, wherein the rubber component further comprises a butadiene rubber.

3. The winter tire of claim 2, wherein the butadiene rubber has a cis-1,4 bond content of not less than 90% by weight.

4. The winter tire of claim 1, wherein the cyclopentadiene-based resin is a hydrogenated cyclopentadiene-based resin.

5. The winter tire of claim 4, wherein the rubber component comprises 10% to 80% by mass of a natural rubber and 20% to 90% by mass of a butadiene rubber having a cis-1,4 bond content of not less than 90% by weight.

6. The winter tire of claim 5, wherein a rubber hardness (Hs) of the rubber composition is 40 to 60.

7. The winter tire of claim 1, wherein the rubber component comprises 10% to 80% by mass of a natural rubber and 20% to 90% by mass of a butadiene rubber having a cis-1,4 bond content of not less than 90% by weight.

8. The winter tire of claim 1, wherein a rubber hardness (Hs) of the rubber composition is 40 to 60.

* * * * *